United States Patent [19]

McCollum, Jr.

[11] 3,781,912

[45] Dec. 25, 1973

[54] N-WAY ANALOG SIGNAL FADER

[75] Inventor: James H. McCollum, Jr., Cedar Rapids, Iowa

[73] Assignee: Collins Radio Company, Dallas, Tex.

[22] Filed: Dec. 29, 1972

[21] Appl. No.: 319,959

[52] U.S. Cl. .................... 330/51, 328/104, 330/110, 330/147

[51] Int. Cl. .............................................. H03f 3/00

[58] Field of Search .................... 330/51, 30 R, 110, 330/147; 328/104, 154; 307/243

[56] References Cited

UNITED STATES PATENTS 2,937,369 5/1960 Nenbold et al. ............... 330/51 UX

*Primary Examiner*—Herman Karl Saalbach
*Assistant Examiner*—James B. Mullins
*Attorney*—Richard W. Anderson et al.

[57] ABSTRACT

A DC analog signal fader employing a single operational amplifier permits fading onto a common output the level of a selected one of a plurality of input signals. A newly selected signal is faded from the level of a next previously selected input and in a manner which does not introduce lag or step level changes at the output.

4 Claims, 2 Drawing Figures

N-WAY ANALOG SIGNAL FADER

This invention relates generally to analog signal fading means and more particularly to an analog signal fader by means of which any one of a number of DC analog signals may be faded into a common output from any existing output line level. More particularly the analog fader of the present invention provides a means for fading from the level of any previously selected one of a plurality N output signals to the level of any other subsequently selected one of N output signals in a manner such as there is no delay (time lag) applied to the signals as they pass through the fader circuitry, and no step function generated on the output.

Control circuitry, particularly servo control circuitry, may oft times operate with gain changing during particular operational phases. For example, autopilot control circuitry for a radio beam capture function might incorporate gain changes in the command signal formulation channel as a function of the magnitude of the radio deviation signal.

In systems of this type, it is extremely important that there be no delay (time lag) applied to a command signal as a discreet gain change is initiated, and that the command signal may fade from one channel gain level to another without producing a step change in the output.

The object of the present invention is accordingly the provision of a DC analog signal fader to which any desired plurality of input signals may be applied, and which, in response to associated logic switching, will fade the output signal from any previously selected input level to any one of the other of the plurality of input signal levels in a manner producing no time lag between the signal as it is applied at the input and the signal as it is faded into the output line and in a manner by which no step changes are produced in the output.

The present invention is featured in the provision of an N-Way analog signal fader which eliminates transients at the output while switching between signal inputs of different amplitudes and/or polarities.

The invention is further featured in the provision of an N-Way analog signal fader by means of which the fading time constant of each channel may be adjusted independently of the other channels to provide design versatility.

The present invention is further featured in the provision of a fader circuit employing a single operational amplifier by which a random sequence of selected ones of a plurality of input signals may be faded to a common output line with no lag or step function.

These and other features and objects of the present invention will become apparent upon reading the following description with reference to the accompanying drawing in which.

Figure 1:
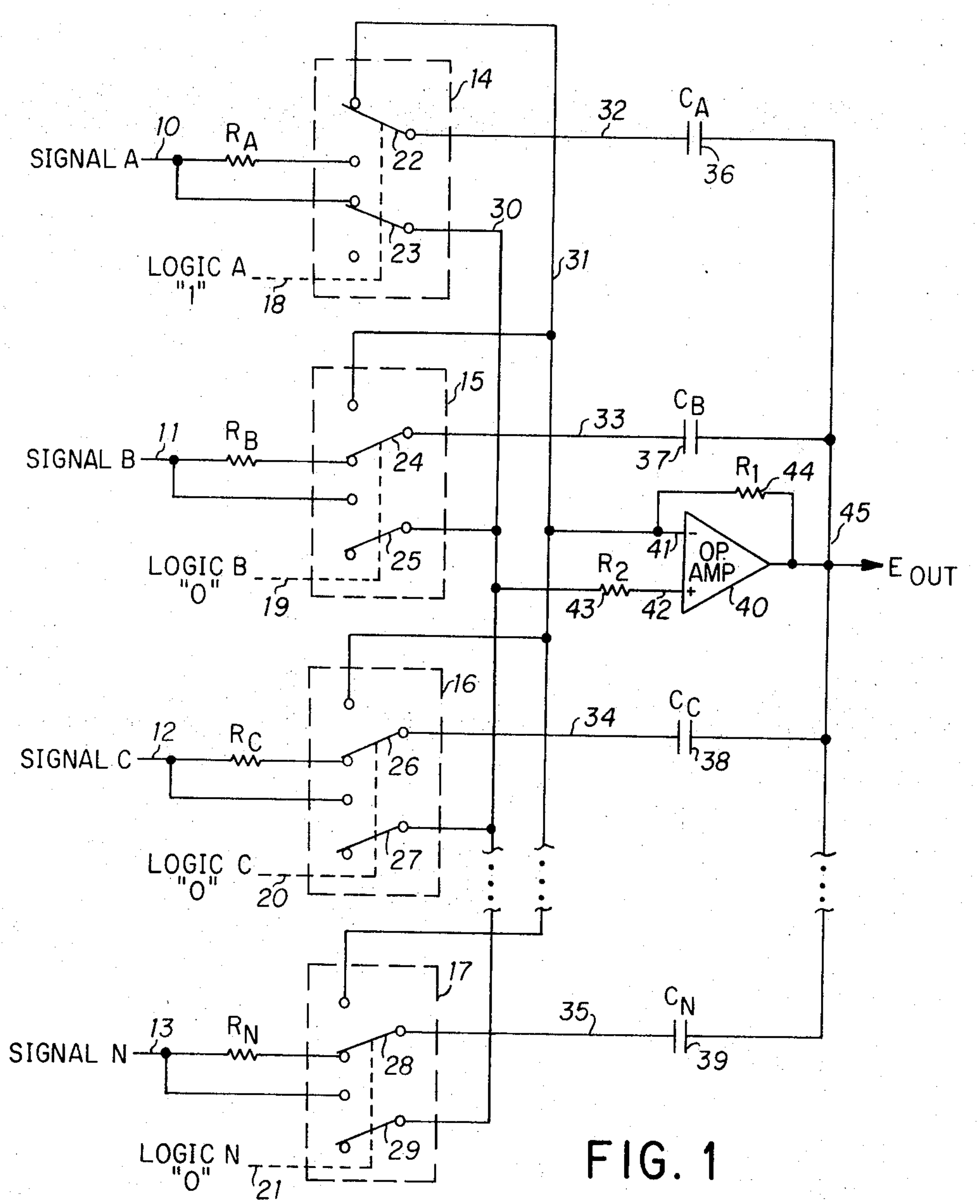
Figure 2:
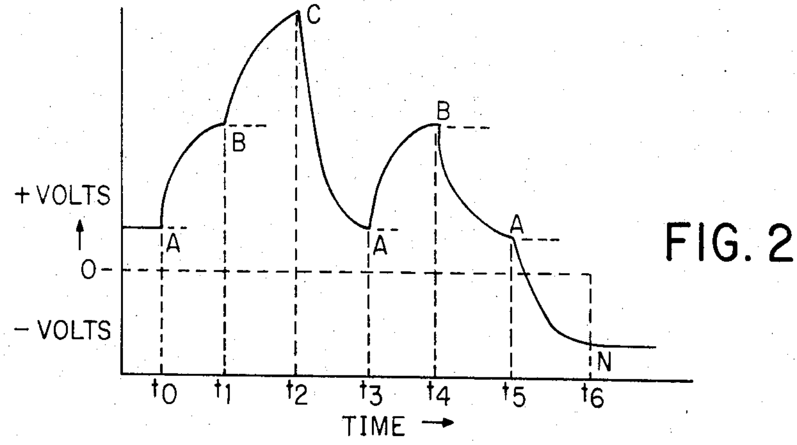

FIG. 1 is a functional schematic diagram of an N-Way analog signal fader in accordance with the present invention; and FIG. 2 is a diagrammatic representation of output wave forms obtainable from the circuitry of FIG. 1 as an exampled sequence of input signals are selected to be faded into a common output line from the level existing on the common output line from a previously selected input.

The exampled embodiment of FIG. 1 depicts a four-channel embodiment by means of which signals A, B, C and N may be faded into a common output line. It is to be emphasized that any number of input signals, each in conjunction with associated logic switching, may be embodied in accordance with the principles of the present invention. Accordingly, FIG. 1 illustrates the manner in which any number of input signals and their associated logic controlled switch and a fading time constant determining a capacitor may be embodied in a symmetrically repetitive circuit.

As depicted in FIG. 1, the N-Way fader circuitry is comprised of an operationally amplifier 40 and two resistors 43 and 44, identified by $R_1$ and $R_2$. $R_1$ and $R_2$ are of equal value to minimize operational amplifier standoff. The value of resistors of $R_1$ and $R_2$ is one of the determining factors in the fade time constant of the circuitry. Each input signal to be faded into the common output is in circuit with an associated analog switch and capacitor. Accordingly, input signal A is associated with analog switch 14 and capacitor 36; input signal B is associated with analog switch 15 and capacitor 37; input signal C is associated with analog switch 16 and capacitor 38; and input signal "N" is associated with analog switch 17 and capacitor 39.

Each of the analog switches 14–17 is functionally depicted as being positioned (by an associated input logic 18–21) to one of two positions. Switch 14 is depicted in the upper (energized) position in response to its associated logic "A" input 18 being a logic "1." The remaining switches 15, 16 and 17 are shown in their "deenergized" lower positions, in response to their associated logic inputs 19, 20 and 21 being logic "0." The upper depicted switch sections 22, 24, 26 and 28 are seen to connect an associated capacitor member (36, 37, 38, 39) to a common switch output line 31 when the switch section is in the energized position (as depicted in FIG. 1 for the signal A switch 14). The upper switch sections 22, 24, 26 and 28, in the deenergized positions thereof (as depicted in FIG. 1 for switches 15, 16 and 17) connects the associated capacitor member through an associated resistor member $R_a$, $R_b$, $R_c$, $R_n$, etc. to the associated signal input (10, 11, 12, 13).

The lower switch sections (23, 25, 27, 29) of each of the channel switches depicted in FIG. 1, in the upper (energized) positions thereof, connect the associated signal input (10, 11, 12, 13) to a common line 30.

Switch output line 31 is connected to the negative or inverting input 41 of operational amplifier 40, while common switch line 30 connects through resistor 43 to the positive (noninverting) input 42 of operational amplifier 40.

Capacitors 36–39 ($C_a$, $C_b$, $C_c$, $C_n$) are connected between the operational amplifier output 45 and the upper switch section of associated ones of switches 14, 15, 16 and 17.

Although FIG. 1 illustrates four input signals (A, B, C and N), it is to be again emphasized that any number of input signals may be incorporated into the symmetrical circuit arrangement, with each input signal being applied through an associated logic controlled switch means and each associated with a capacitor connected between the upper switch section and the output 45 of the operational amplifier 40.

The multisignal fader of FIG. 1 permits the selection of a particular input signal for application to the output line 45 by energization of its associated switch. One, and only one, of the logic switching inputs is a logic "1" to energize its associated switch at any one time. Thus, in FIG. 1, the switch 14 associated with the signal A channel is depicted as being in the energized position with its logic input 18 being a logic "1." The three remaining analog switches are illustrated in their de-energized positions corresponding to logic "0's" being applied to their associated analog switches.

With the assumption, then, that the logic "A" input 18 to analog switch 14 is a "1" and all other logic inputs are logic "0", the analog switching is depicted in FIG. 1 as being set up to apply signal A from input line 10 through the lower switch section 23 of the associated switch 14 through common line 30 and resistor 43 to the positive (noninverting) input 42 of the operational amplifier 40. The channel A capacitor 36 is connected through the upper switch section 22 of switch 14 through line 31 to the negative (inverting) input 41 of operational amplifier 40, thus placing channel capacitor 36 in parallel with resistor 44 in the feedback path for operational amplifier 40. Since signal A from input line 10 is being applied to the positive (noninverting) input of an amplifier which is connected as a voltage follower, the output 45, $E_{out}$, from operational amplifier 40 is equal to signal A, and no lead or lag is applied. The fade time constant in this condition is $R_1C_A$.

The remaining signal inputs B, C and N, on lines 11, 12 and 13, are connected through their associated de-energized switches 15, 16 and 17 to their respective fader capacitors 37, 38 and 39, the connection being made through an associated resistor $R_b$, $R_c$ and $R_n$ which controls the charging time of the fader capacitor. Thus signal B on input line 11 is applied through resistor $R_B$ to charging capacitor $C_b$, signal C on input line 12 is applied through resistor $R_C$ to charging capacitor $C_C$, and signal N on input line 13 is applied through resistor $R_N$ to charging capacitor $C_N$.

With the aforedescribed connections, capacitors $C_B$, $C_C$ and $C_N$, will become charged to the difference between $E_{out}$on output line 45 (in this example, the signal A level) and their respective input signal level. Voltages across charging capacitors $C_B$, $C_C$ and $C_N$ are therefore defined as:

$V_{C_B}$ = signal A − signal B
$V_{C_C}$ = signal A − signal C
$V_{C_N}$ = signal A − signal N.

Assuming now that the logic applied to the switches 14–17 is instantaneously changed to have logic B input 19 become a logic "1" and all other logic inputs be logic "0", the following sequence occurs: Signal A on line 10 is disconnected from the positive input 42 of operational amplifier 40; and signal B on line 11 is connected to the positive input 42 of operational amplifier 40; charging capacitor $C_A$ is removed from and charging capacitor $C_B$ is connected to, the negative input 41 of operational amplifier 40. Now by considering the voltages on the operational amplifier 40, it is seen that charging capacitor $C_B$ forces the voltage on the feedback of the operational amplifier to be (Signal A − Signal B) = $E_A - E_B$, while the positive input of the operational amplifier has applied thereto newly selected signal B ($E_B$) from line 11. By summing voltages; $(E_A - E_B) + (E_B) = E_A = E_{out}$, and it is seen that the output 45 remains at $E_A$ (the signal A level) at the instant the logic is changed on the analog switches. However the output 45 does not stay at this level, since charging capacitor $C_B$ is now parallel with the feedback capacitor $R_1$ of the operational amplifier, and the voltage across the charging capacitor $C_B$ decays at the $R_1C_B$ time constant to zero volts. As this decay occurs, the output voltage 45 smoothly changes (fades) from the $E_A$ level to the newly selected $E_B$ level, with the final value of the output 45 being equal to the level of signal B. If in this fading process, newly selected signal B was changing in level, the output 45 would have been changing by exactly the same amount, thus not adding any lag to signal B on line 11 as it appears on output line 45.

As the output signal level 45 fades to the newly selected signal B level, all the other charging capacitors, $C_A, C_C \ldots C_N$, are now charged to new levels representing the difference between the levels of their associated signal sources 10, 12 and 13 and the level of newly selected signal B. Switching to any other input signal results in actions similar to that above described.

The resistors $R_A$, $R_B$, $R_C$, and $R_N$ associated with each channel determine how rapidly the associated charging capacitor $C_A$, $C_B$, $C_C$ and $C_N$ charge, and preferably would be chosen to be small values to increase the system cycling rate, but not so small in value as to produce loading on the operational amplifier 40 or the signal sources 10, 11, 12 and 13.

The fading time constant of each channel is determined by the channel charging capacitor ($C_A$, $C_B$, $C_C$ or $C_N$) and $R_1$, may be selected to be any value within practical limits (for example, from a few milliseconds to several seconds). Further, the time constants need not be the same. For system versatility for example, the charging capacitor $C_A$, $C_BC_C$ and $C_N$ might be of discretely different values so as to introduce a discretely different fading time constant for each newly selected input signal.

FIG. 2 illustrates an exampled operational sequence of the N-Way fader circuitry of FIG. 1. FIG. 2 depicts sequential input signal selections from an initial value of A to B, from B to C, from C back to A, from A back to B, and from B back to A, and from A to N, the latter depicting that fading from an existing output signal level to a newly selected level may occur between signal inputs of different polarities as well as different amplitudes. It is to be emphasized that the fading circuitry of FIG. 1 may be utilized to fade sequentially back and forth between a pair of input signal levels or between any one of a plurality of input signal levels and the level of any other one of the plurality of input signals.

The wave forms depicted in FIG. 2 illustrate a particular sequence of input signal selections with each succeeding selected signal level being faded in at the same time constant to the newly selected level, inferring that all channel charging capacitors are of equal value. Further, the FIG. 2 signal selection and fading sequence depicts a succeeding one of the input signal levels being selected by application of a logic "1" input to the associated channel analog switch at the instant in time that the previously selected level has been attained, it being understood that the circuitry of FIG. 1 imposes no such limitation and that the depicted sequence of FIG. 2 does not impose a periodic switching sequence.

With reference to FIG. 2 and Table 1 below, FIG. 2 depicts at time $t_0$ an output level corresponding to signal A and selection at $t_0$ of input signal B. At time $t_1$ FIG. 2 depicts the selection of input signal C with the level C being attained at time $t_2$ at which input level A is selected, etc. Table 1 depicts the permutation of switching logic applied to the channel analog switches at the particular times depicted in FIG. 2, it being noted and emphasized that one and only one of the switch logic inputs is a switch energizing logic "1" at any one time.

TABLE 1

| | $t_0$ | $t_1$ | $t_2$ | $t_3$ | $t_4$ | $t_5$ |
|---|---|---|---|---|---|---|
| LOGIC A | 0 | 0 | 1 | 0 | 1 | 0 |
| LOGIC B | 1 | 0 | 0 | 1 | 0 | 0 |
| LOGIC C | 0 | 1 | 0 | 0 | 0 | 0 |
| LOGIC N | 0 | 0 | 0 | 0 | 0 | 1 |

The present invention is thus seen to provide a highly versatile and simple analog signal fader by means of which any one of a plurality of input signals may be selected and its level faded from an existing output level to the newly selected level in a manner introducing no lag between the input signal selected and its appearance at the output, and in a manner introducing no step transients. The plurality of input signals may comprise any number of DC analog signals. It is not required that the signal inputs be nonrelated, since they may indeed be functions of the same signal at a different gain level, and the input signals may be different amplitudes and/or polarities.

Although the present invention has been defined with respect to a particular embodiment thereof, it is not to be so limited as changes might be made therein which fall within the scope of the invention as defined in the appended claims.

I claim:

1. An analog signal fader for fading any one of a plurality of DC input signals onto a common output line from the level of a next previously selected one of said plurality of input signals comprising; an operational amplifier having a noninverting input, an inverting input, and an output terminal comprising said common output line, a feedback resistor connected between said amplifier output terminal and said inverting input; a plurality of switching means; each of said plurality of input signals being selectively applied through an energized position of an associated one of said switching means to said noninverting input of said operational amplifier; a plurality of capacitors, each of said plurality of input signals being selectively applied through a de-energized position of said associated one of said switching means and through said associated one of said capacitors to said operational amplifier output terminal; each of said capacitors, through an energized position of said associated one of said switching means being connected in parallel with said operational amplifier feedback resistor; and means for selectively energizing a selected one of said switching means to the exclusion of the remaining ones of such switching means in response to which the output of said operational amplifier is faded from an existing level to that defined by the input signal applied to said selectively energized one of said switching means.

2. An analog signal fader as defined in claim 1 comprising a further resistor member like that of said operational amplifier feedback resistor connected to said operational amplifier noninverting input, and through which said selected one of said plurality of input signals is applied through energized ones of said associated switching means to said operational amplifier noninverting input.

3. An analog signal fader as defined in claim 2 comprising a further plurality of resistive members, each of said plurality of input signals being applied through an associated one of said further plurality of resistive members to said associated ones of said capacitors with the associated one of said plurality of switching means in a de-energized position.

4. An analog signal fader as defined in claim 3 wherein said switching means comprises logic means for energizing the switch associated with a selected input signal to the exclusion of the remaining ones of said switches, said selected switch energization being maintained until a next successively selected one of said switches is energized to fade the associated one of said input signals to said common output line.

* * * * *